Figure 1:
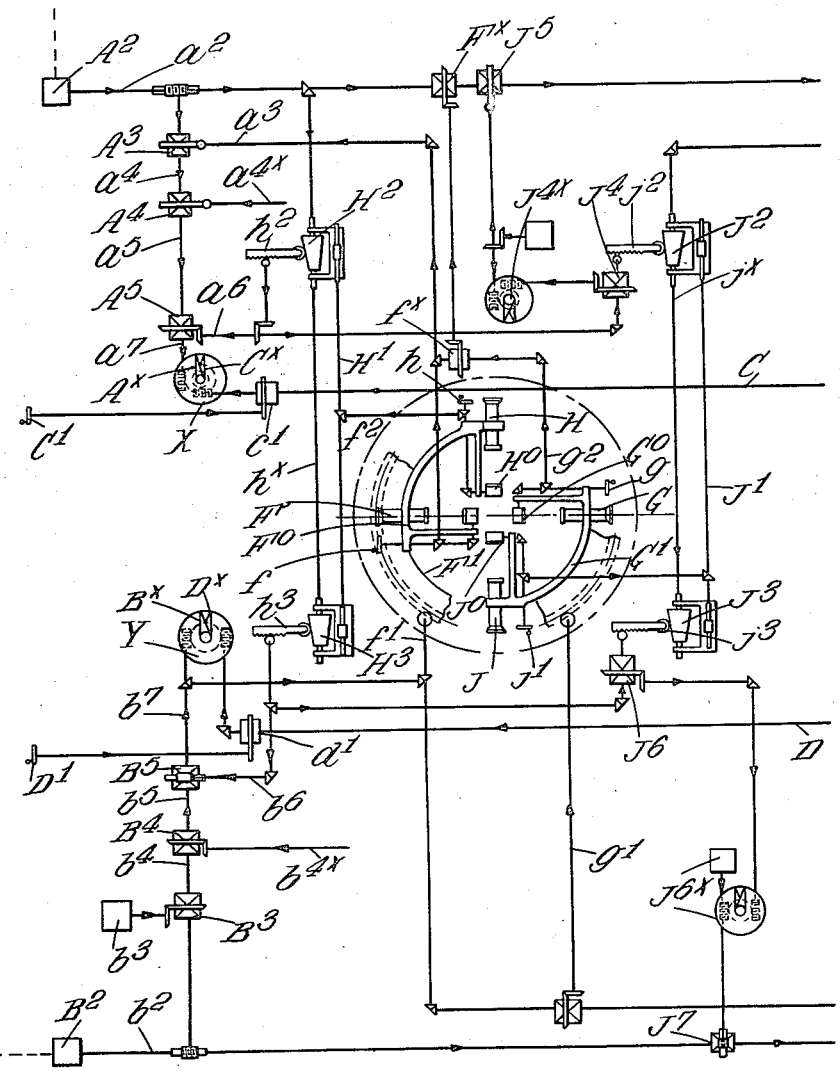

Dec. 20, 1932.    J. P. WATSON    1,891,397
APPARATUS FOR USE IN THE FIRE CONTROL OF ANTIAIRCRAFT GUNS
Filed Nov. 28, 1931    2 Sheets-Sheet 1

Dec. 20, 1932.   J. P. WATSON   1,891,397
APPARATUS FOR USE IN THE FIRE CONTROL OF ANTIAIRCRAFT GUNS
Filed Nov. 28, 1931   2 Sheets-Sheet 2
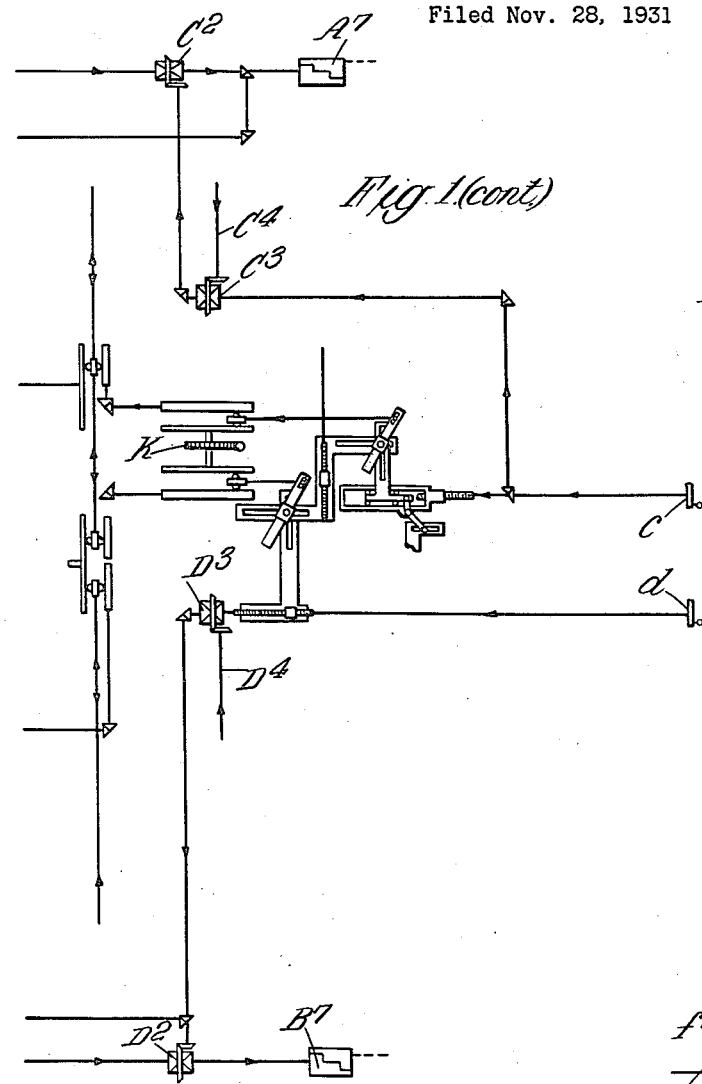
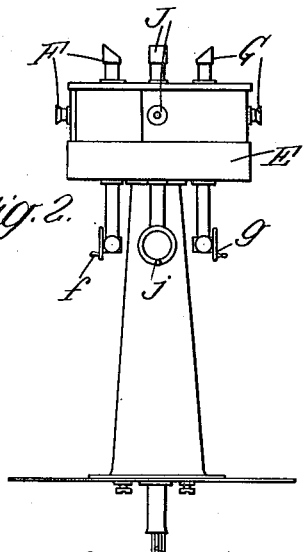
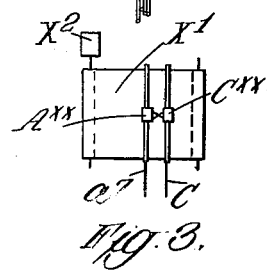
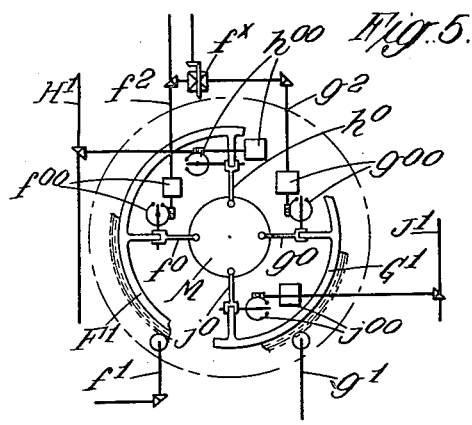
Inventor
John Percival Watson
By Pennie, Davis, Marvin & Edmonds
Attorneys Patented Dec. 20, 1932

1,891,397

UNITED STATES PATENT OFFICE

JOHN PERCIVAL WATSON, OF WESTMINSTER, ENGLAND, ASSIGNOR TO VICKERS-ARMSTRONGS LIMITED, OF LONDON, ENGLAND, A BRITISH COMPANY

APPARATUS FOR USE IN THE FIRE CONTROL OF ANTIAIRCRAFT GUNS

Application filed November 28, 1931, Serial No. 577,845, and in Great Britain December 1, 1930.

This invention relates to apparatus for use in the fire control of antiaircraft guns the said apparatus comprising a calculator which, when properly adjusted, indicates and/or transmits to the gun or guns the required data for laying the guns against the target. The chief object of the invention is to adapt such an apparatus for use on a ship or other unstable platform where the errors in elevation and training due to the rolling or rocking and other movements of such platforms have to be corrected.

According to the invention I provide means for correcting the angle of elevation or "site" of the target derived from a controlling or "director" sight (which angle includes the disturbance due to the roll angle) for the vertical error due to the rolling or rocking of the platform and for comparing the corrected or "stabilized" elevation (or a function thereof) with the elevation angle (or a function thereof) produced by the calculator (which latter angle is independent of the roll) so as to enable the setting of the latter to be kept properly adjusted. Similarly I provide means for correcting the angle of training derived from the controlling sight for the lateral error due to the rolling or rocking of the platform and for comparing the corrected or "stabilized" training angle (or a function thereof) with the training angle (or a function thereof) produced by the calculator so as to enable the latter to be kept properly adjusted. The uncorrected or "unstabilized" angles obtained from the controlling sight may be associated mechanically with the rolling or rocking corrections determined in any suitable manner and the resultant angles, which are the corrected or "stabilized" angles of elevation and training, may be indicated by means of pointers moving co-axially with other pointers which are driven from the calculator in accordance with the angles of elevation and training produced thereby, the latter angles being termed the "generated" angles. By adjusting the setting portions of the calculator so as to cause the pointers operated thereby to move in synchronism with the first-mentioned pointers, the calculator will be properly set for the given conditions at any moment. Alternatively either or each of the two sets of pointers may be replaced by a plotting device which makes two plots on a moving sheet or band of paper, one plot being in accordance with the corrected or "stabilized" angles received from the controlling sight and the other being in accordance with the generated angles. The calculator is then adjusted so as to cause the second plot to fall on the mean or smoothed path of the first-mentioned plot and in this manner inequalities in the transmission of the corrected or "stabilized" angles are smoothed out. I also provide means for incorporating corrections due to the different angular positions both in elevation and in training occupied at any moment by the controlling sight and the gun or guns due to vertical and lateral deflections applied to the latter. I furthermore provide means whereby the uncorrected or "unstabilized" angles of elevation and training obtained from the controlling sight have added to them various corrections hereinafter referred to in order to determine the correct angles of gun elevation and gun training to be transmitted to the gun or guns.

In order that the said invention may be clearly understood and readily carried into effect, the same will now be described more fully with reference to the accompanying drawings, in which:—

Figures 1 and 1 (cont.) comprise a diagram illustrating a form of apparatus according to this invention, Figure 2 is an elevation of a periscope arrangement hereinafter described for measuring the roll, Figure 3 is a view of the aforesaid plotting device, and Figures 4 and 5 are diagrams illustrating alternative methods of measuring the roll.

Referring to Figure 1, A is the controlling sight which is trunnioned to a training carriage B. The elevation of the sight by a hand-wheel $a$ in following the target is a measure of the "unstabilized" angle of elevation of the target and the training of the carriage B by a hand-wheel $b$ in following the target is a measure of the "unstabilized"

angle of training. The hand-wheel $a$ operates a transmitter $A^1$ which causes a receiving motor $A^2$ to move in accordance with "unstabilized" angle of elevation. The handwheel $b$ operates a transmitter $B^1$ which causes a receiving motor $B^2$ to move in accordance with "unstabilized" angle of training. The calculator comprises a constant speed motor K and linkages and mechanisms generally similar to those described in the specifications of English Patents Nos. 236,250 and 236,251, which are substantially duplicated by the U. S. patents to Gray 1,821,968 and 1,831,595, issued respectively on September 8, and Oct. 10, 1931, the said calculator driving a shaft C in accordance with "generated" elevation and a shaft D in accordance with "generated" training.

The aforesaid elevation receiving motor $A^2$ operates a shaft $a^2$ which drives either directly or through a power relay one element of a differential gear $A^3$ the second element of which is operated by a shaft $a^3$ in accordance with the angle of roll in the normal vertical plane which contains the axis of the controlling sight when its trunnion axis is truly horizontal (herein termed "sight roll") as hereinafter described. The third element of this differential gear in turn operates through a shaft $a^4$ the first element of a second differential gear $A^4$ the second element of which is operated in accordance with a correction for the speed of "own" ship, which correction is imparted by a shaft $a^{4x}$ driven by the calculator. The third element of this second differential gear drives through a shaft $a^5$ the first element of a third differential gear $A^5$ the second element of which is operated from a shaft $a^6$ by mechanism hereinafter described in accordance with the cross level correction for sight elevation. This correction which I term the "sight elevation cross level" is equal to the difference between the angle of elevation or "site" in a vertical plane when the sight trunnions are truly horizontal and the corresponding angle in a vertical plane, measured from the same datum plane, when the sight trunnions are inclined due to roll. The movement of the third element of the last mentioned differential gear $A^5$ is a measure of "unstabilized" angle of elevation from the controlling sight, $\pm$ roll, $\pm$ "own" speed correction, $\pm$ "sight elevation cross level" correction, that is to say it is in accordance with "stabilized" and corrected elevation. The said third element drives a shaft $a^7$ which rotates a pointer $A^x$ arranged contiguous to a pointer $C^x$ driven from the aforesaid shaft C operated by the calculator in accordance with "generated" elevation, these pointers preferably moving over a graduated dial X. After the calculator has been set to the "present" angle of elevation by means of an elevation tuning handle $C^1$ (operating upon the pointer $C^x$ through a differential gear $c^1$) in order to bring the pointers together, the vertical deflection setting handle $c$ of the calculator is adjusted as required in order to keep the second pointer $C^x$ moving at the same rate as the first pointer $A^x$ and by so doing the calculator is properly adjusted. The movement of the shaft $a^2$ driven by the receiving motor $A^2$ operates a gun elevation transmitter $A^7$ after having added to its movement certain other movements (including the vertical deflection) as hereinafter described. In the alternative construction hereinbefore referred to in which the pointers are replaced by a plotting device as shown in Figure 3 the shaft $a^7$ driven by the third element of the third differential gear $A^5$ operates the pencil $A^{xx}$ of this plotting device, the other pencil $C^{xx}$ being operated from the shaft C driven by the calculator in accordance with "generated" elevation; the sheet or band of paper $X'$ on which the plots by the said pencils are made is, of course, moved at a constant speed by a motor $X^2$ or other suitable means.

The aforesaid training receiving motor $B^2$ operates a shaft $b^2$ which drives the first element of a differential gear $B^3$ the second element of which is driven in accordance with yaw from a yaw relay $b^3$. The third element of this differential gear operates through a shaft $b^4$ the first element of a second differential gear $B^4$ the second element of which is operated by a shaft $b^{4x}$ in accordance with "own" speed effect obtained from the calculator. The third element of this differential gear drives through a shaft $b^5$ the first element of a third differential gear $B^5$ the second element of which is operated from a shaft $b^6$, by mechanism hereinafter described, in accordance with the "sight training cross level" correction which is equal to the angle in a datum horizontal plane formed by the traces of the vertical plane containing the line of sight when the sight trunnions are truly horizontal and the vertical plane containing the line of sight when the sight trunnions are inclined. The third element of the said second differential gear thus moves in accordance with the "stabilized" and corrected training and drives a shaft $b^7$ which rotates a pointer $B^x$ arranged contiguous to a pointer $D^x$ driven from the aforesaid shaft D operated by the calculator in accordance with "generated" training, these pointers preferably moving over a graduated dial Y. After the calculator has been set to the "present" angle of training by means of a training tuning handle $D^1$ (operating upon the pointer $D^x$ through a differential gear $d^1$) in order to bring the pointers together, the lateral deflection setting handle $d$ of the calculator is adjusted as required in order to keep the second pointer $D^x$ moving at the same rate as the first pointer $B^x$ and by so doing the calculator is properly adjusted. The movement of the shaft $b^2$ driven by the receiving motor $B^2$ operates a gun training transmitter $B^7$ after having added to its movements certain other movements (including the lateral deflection) as hereinafter described. In the alternative construction hereinbefore referred to in which the pointers are replaced by a plotting device, the shaft $b^7$ driven by the third element of the differential gear $B^5$ operates the corresponding portion of this plotting device, the other portion being operated from the shaft D driven by the calculator in accordance with "generated" training as will be understood by reference to Figure 3.

Although in the construction above described the corrections for "own" speed on the elevation and training angles are superimposed on the elevation and training movements received from the controlling sight, these corrections may be applied as corrections to the vertical and lateral deflections, which corrections would then be the difference between the deflections due to the rate of movement of "own" ship and the actual deflections due to the effect of "own" speed on the velocity of the shell.

The measurement or determination of the roll according to Figure 1 is effected by means of four periscopes (see Figure 2) mounted in a casing E above the deck so as to use the horizon as a stable datum horizontal line. These periscopes are arranged in two systems, one to measure in the normal vertical plane of the sight the roll along the "stabilized" line of sight and also the roll in a vertical plane at right angles thereto and the other to measure in the normal vertical plane of the gun the roll along the "stabilized" line of the gun and the roll in a vertical plane at right angles thereto. If the line of sight is the same as the line of the gun (i. e. if there is no lateral deflection) then the centres of the systems will be 180° apart. The second system may, however take up a position on either side of the 180° position when lateral deflection corrections have been applied as will be hereinafter described. In Figure 1 the periscopes have, for simplification, been shewn as being directly connected to the roll corrector gears although it will, of course, be understood that with the arrangement shown by Figure 2 with the periscopes arranged above deck (and the calculator and its associated parts arranged below deck) suitable transmitting mechanism would be employed. It will also be understood that instead of periscopes above deck telescopes could be used and the expression "periscope" in the ensuing description is intended to include a telescope.

For determining the "sight roll" (i. e. the roll in the normal vertical plane of the sight) I provide in Figure 1 a periscope F mounted on a support $F^1$ which is moved in azimuth by a shaft $f^1$ driven from the aforesaid shaft $b^7$ and which is sighted on the horizon. In the field of view of this periscope there is an inclined mirror $F^o$ which is angularly adjustable by a handle $f$ in order to keep the line of sight on the horizon; the movement of the handle $f$ is therefore a measure of the "sight roll". The movement of the said handle is transmitted by suitable mechanism to the shaft $a^3$ operating the second element of the differential gear $A^3$ associated with the elevation receiving motor $A^2$. A second periscope G is arranged opposite to the first periscope F and is carried by a support $G^1$ which is adjustable laterally from a shaft $g^1$ that moves in accordance with "stabilized" gun training so that these two periscopes at any moment make an angle to one another equal to the total azimuth lateral deflection between the sight line and the line of fire of the gun. The said second periscope G has associated with it an inclined mirror $G^o$ angularly adjustable by a handle $g$ to maintain the line of sight on the horizon and the movement of this handle is therefore a measure of the roll in the normal vertical plane containing the axis of the gun, which movement I term the "gun roll". A measure of this gun roll is required to obtain a measure of the difference between the "sight roll" and the "gun roll" (this being termed the "roll difference" which is the difference in the roll angles measured in the normal vertical planes containing the axes of the sight and gun) and is obtained by interposing a differential gear $f^x$ between shafts $f^2$, $g^2$ driven by the handles $f$, $g$, the third element of this gear therefore moving in accordance with the algebraic sum of the said movement, i. e. in accordance with the "roll difference". The movement of this third element is transmitted to a differential gear $F^x$ interposed between the elevation receiving motor $A^2$ and the gun elevation transmitter $A^7$.

For determining the roll in a vertical plane at right angles to the normal vertical plane of the sight (termed the "sight trunnion roll") I provide a periscope H mounted on the support $F^1$ so that its axis is at right angles to the axis of the periscope F that determines the "sight roll". The periscope H is sighted on the horizon and has associated with it an inclined mirror $H^o$ angularly adjustable by a handle $h$ the movement of which is a measure of the "sight trunnion roll". The said handle operates a screwed shaft $H^1$ which serves to traverse two "camoids" or three-dimentional cams $H^2$, $H^3$ the first of which imparts movement to a rack member $h^2$ which operates the second element of the differential gear $A^5$ by which the elevation pointer $A^x$ is operated, the operation of this second element being in accordance with the "sight elevation cross level" correction. The other camoid $H^3$ imparts movement to a rack member $h^3$ which operates in accordance with "sight training cross level" correction the second element of the differential gear $B^5$ that drives the training pointer $B^x$. Both these camoids are rotated by a shaft $h^x$ driven from the shaft $a^2$ in accordance with the "unstabilized" angle of elevation. Alternatively the camoids may be traversed for "unstabilized" angle of elevation and rotated for "sight trunnion roll". Arranged opposite to the periscope H that ascertains the "sight trunnion roll" and mounted on the traversing support $G^1$ that carries the periscope G for ascertaining the "gun roll", is another periscope J arranged with its axis at right angles to the axis of the "gun roll" periscope G, this further periscope being for the purpose of ascertaining the "gun trunnion roll", that is to say the roll in a vertical plane at right angles to the normal vertical plane containing the axis of the gun. This "gun trunnion roll" periscope has associated with it an inclined mirror $J^o$ angularly adjustable by a handle $j$ in order to keep the sight line on the horizon and the movement of the said handle is therefore a measure of the said "gun trunnion roll". This handle operates through suitable mechanism a screwed shaft $J^1$ serving to traverse a "camoid" or three-dimensional cam $J^2$ which is rotated by a shaft $j^x$ from the shaft that carries the gun elevation transmitter $A^7$ and which imparts motion to a rack member $j^2$ in accordance with the "gun elevation cross level" which is a correction similar to the aforesaid "sight elevation cross level" except that the angles are measured by vertical planes containing the axis of the gun. The movement of this member is associated by means of a differential gear $J^4$ with the movement of the shaft $a^6$ derived from the "sight elevation cross level" camoid $H^2$ and the resultant of these two movements, which is the difference between the "sight elevation cross level" and the "gun elevation cross level", is transmitted either directly or through the relay device $J^{4x}$ shown to a differential gear $J^5$ interposed between the differential gear $F^x$ and the gun elevation transmitter $A^7$. The shaft $J^1$ also traverses another "camoid" or three-dimensional cam $J^3$ which rotates with the other camoid $J^2$ and gives motion to a rack member $j^3$ in accordance with the "gun training cross level" which is a correction similar to the aforesaid "sight training cross level" except that the angles are measured with reference to vertical planes containing the axis of the gun. The movement of this member is compounded by means of a differential gear $J^6$ with the movement of the shaft $b^6$ derived from the aforesaid "sight training cross level" camoid $H^3$ and the resultant which corresponds to the difference between the "gun training cross level" and the "sight training cross level" is imparted either directly or through the relay device $J^{6x}$ shown to a differential gear $J^7$ between the training receiving motor $B^2$ and the gun training transmitter $B^7$. Alternatively the said camoids $J^2$ and $J^3$ may be traversed in accordance with gun elevation and rotated in accordance with "gun trunnion roll".

Instead of determining the cross level corrections by means of "camoids" or three-dimensional cams suitable linkage movements may be employed.

Between the aforesaid differential gear $J^5$ and the gun elevation transmitter $A^7$ there is provided a further differential gear $C^2$ controlled by the vertical deflection setting handle $c$ of the calculator so as to add the vertical deflection to the movement given to the transmitter. Another differential gear $C^3$ is incorporated in the connections between the handle $c$ and the differential gear $C^2$ and is controlled by a shaft $C^4$ operated by the calculator in accordance with the vertical deflection corrections for tangent elevation, wind and spotting, so that such corrections are incorporated in the movement given to the transmitter $A^7$. Similarly between the aforesaid differential gear $J^7$ and the gun training transmitter $B^7$ there is provided a further differential gear $D^2$ controlled by the lateral deflection setting handle $d$ of the calculator so as to add the lateral deflection to the movement given to the said transmitter. Another differential gear $D^3$ is incorporated in the connections between the handle $d$ and the differential gear $D^2$ and is controlled by a shaft $D^4$ operated by the calculator in accordance with the lateral deflection corrections for drift, wind and spotting so that such corrections are incorporated in the movement given to the transmitter $B^7$.

In the alternative method shown in Figure 4 for measuring or determining the roll, an artificial horizon replaces the natural horizon on which the periscopes of Figures 1 and 2 are sighted. This artificial horizon takes the form of a mirror L which is stabilized by means of a gyroscope as is well understood and which is situated beneath the inclined adjustable mirrors $F^o$, $G^o$, $H^o$ and $J^o$. The other parts in Figure 4 which correspond to similar parts in Figure 1 are indicated by the same reference letters.

As an alternative to employing inclined adjustable mirrors for measuring the roll I may employ adjustable telescopes whose movements in vertical planes in order to keep them sighted on the horizon or on an artificial horizon are a measure of the roll angles.

In the further method shown in Figure 5 for measuring or determining the roll, the periscopes of Figure 1 are replaced by pivoted arms $f^o$, $g^o$, $h^o$ and $j^o$ the inner ends of which bear upon a horizontal metal disc M stabilized by means of a gyroscope. These arms when they are moved angularly as a result of roll bring into operation relays (indicated diagrammatically at $f^{oo}$, $g^{oo}$ and $j^{oo}$) which drive the shafts $f^2$, $g^2$, $H^1$ and $J^1$ for the purposes hereinbefore described with reference to Figure 1. In Figure 5 the parts which correspond to similar parts in Figure 1 are indicated by the same reference letters.

Instead of or in addition to the aforesaid transmitters $A^7$ and $B^7$ suitable indicators may be employed.

What I claim and desire to secure by Letters Patent of the United States is:—

1. Apparatus for use in the fire control of antiaircraft guns on a ship or other unstable platform, comprising a calculator for producing the generated angle of elevation of the target, said angle being independent of the rolling and rocking of the platform, a controlling sight which, in following the target gives the uncorrected, "unstabilized" angle of elevation of the target, means for correcting said "unstabilized" angle of elevation for the vertical error due to the rolling and rocking of the platform, and means for comparing the corrected, "stabilized" angle of elevation, or a function thereof, with the "generated" angle of elevation produced by the calculator so as to enable the setting of the latter to be kept properly adjusted.

2. Apparatus for use in the fire control of antiaircraft guns on a ship or other unstable platform, comprising a calculator, a member operated by said calculator in accordance with the "generated" angle of elevation of the target, said angle being independent of the rolling and rocking of the platform, a controlling sight, means for elevating said sight in following the target, a member moved by said means in accordance with the uncorrected "unstabilized" angle of elevation, means for determining the vertical error due to the rolling and rocking of the platform, a member moved in accordance with said vertical error, means for algebraically adding the movement of the last-mentioned member to the movement of the member moved in accordance with the "unstabilized" angle of elevation, a member moved in accordance with the resultant corrected, "stabilized" angle of elevation, and means for comparing the movement of the last-mentioned member with the movement of the first-mentioned member so as to enable the setting of the calculator to be kept properly adjusted.

3. Apparatus for use in the fire control of antiaircraft guns on a ship or other unstable platform, comprising a calculator, a member operated by said calculator in accordance with the "generated" angle of elevation of the target, said angle being independent of the rolling and rocking of the platform, a controlling sight, means for elevating said sight in following the target, a member moved by said means in accordance with the uncorrected, "unstabilized" angle of elevation, means for determining the vertical error due to the rolling and rocking of the platform, a member moved in accordance with said vertical error, means for algebraically adding the movement of the last-mentioned member to the movement of the member moved in accordance with the "unstabilized" angle of elevation, a member moved in accordance with the resultant corrected, "stabilized" angle of elevation; a pointer operated by the last-mentioned member, and a comparison pointer operated by the first-mentioned member so that the setting of the calculator can be kept properly adjusted.

4. Apparatus for use in the fire control of antiaircraft guns on a ship or other unstable platform, comprising a calculator, a member operated by said calculator in accordance with the "generated" angle of elevation of the target, said angle being independent of the rolling and rocking of the platform, a controlling sight, means for elevating said sight in following the target, a member moved by said means in accordance with the uncorrected, "unstabilized" angle of elevation, means for determining the vertical error due to the rolling and rocking of the platform, a member moved in accordance with said vertical error, means for algebraically adding the movement of the last-mentioned member to the movement of the member moved in accordance with the "unstabilized" angle of elevation, a member moved in accordance with the resultant corrected, "stabilized" angle of elevation, a plotting device, means operated by the last-mentioned member for making a plot, and means operated by the first-mentioned member for making a corresponding plot, so as to enable the setting of the calculator to be kept properly adjusted.

5. Apparatus for use in the fire control of antiaircraft guns on a ship or other unstable platform, comprising in combination with the elements claimed in claim 2, of means for determining the difference between the angle of elevation in a vertical plane when the controlling sight trunnions are truly horizontal and the corresponding angle in a vertical plane, measured from the same datum plane, when the sight trunnions are inclined due to roll, said angular difference being the sight elevation cross level, a member moved in accordance with said angular difference, and means for incorporating the movement of said member in the movement of the member moving in accordance with the "stabilized" angle of elevation.

6. Apparatus for use in the fire control of antiaircraft guns on a ship or other unstable platform, comprising in combination with the elements claimed in claim 2, of means for determining the difference in the roll-angles measured in the normal vertical planes containing the axes of the sight and gun, a member moved in accordance with said roll-difference, means for algebraically adding the movement of the last-mentioned member to the movement of the member moving in accordance with the "unstabilized" angle of elevation of the controlling sight, and a third member moving in accordance with the sum thereof.

7. Apparatus for use in the fire control of antiaircraft guns on a ship or other unstable platform, comprising in combination with the elements claimed in claim 2, of means for determining the difference in the roll-angles measured in the normal vertical planes containing the axes of the sight and gun, a member moved in accordance with said roll-difference, means for algebraically adding the movement of the last-mentioned member to the movement of the member moving in accordance with the "unstabilized" angle of elevation of the controlling sight, and a third member moving in accordance with the sum, means for determining the difference between the angle of elevation in a vertical plane when the controlling sight trunnions are truly horizontal and the corresponding angle in a vertical plane, measured from the same datum plane, when the sight trunnions are inclined due to roll, said angular difference being the sight elevation cross level, a member moved in accordance with said angular difference, means for determining the difference between the angle of elevation in a vertical plane when the gun trunnions are truly horizontal and the corresponding angle in a vertical plane when the gun trunnions are inclined to roll, said angular difference being the gun elevation cross level, a member moved in accordance with said gun elevation cross level, means for determining the difference between the movements of the members moving in accordance with sight elevation cross level and gun elevation cross level, and means for algebraically adding to the movement of said third member a movement in accordance with the last-mentioned difference.

8. Apparatus for use in the fire control of antiaircraft guns on a ship or other unstable platform, comprising a calculator for producing the generated angle of training of the target, said angle being independent of the rolling and rocking of the platform, a controlling sight for following the target and giving the uncorrected, "unstabilized" angle of training of the target, means for correcting said "unstabilized" angle of training for the lateral error due to the rolling and rocking of the platform, and means for comparing the corrected, "stabilized" angle of training, or a function thereof, with the "generated" angle of training produced by the calculator so as to enable the setting of the latter to be kept properly adjusted.

9. Apparatus for use in the fire control of antiaircraft guns on a ship or other unstable platform, comprising a calculator, a member operated by said calculator in accordance with the "generated" angle of training of the target, said angle being independent of the rolling and rocking of the platform, a controlling sight, means for training said sight in following the target, a member moved by said means in accordance with the uncorrected, "unstabilized" angle of training, means for determining the lateral error due to the rolling and rocking of the platform, a member moved in accordance with said lateral error, means for algebraically adding the movement of the last-mentioned member to the movement of the member moved in accordance with the "unstabilized" angle of training, a member moved in accordance with the resultant corrected, "stabilized" angle of training, and means for comparing the movement of the last-mentioned member with the movement of the first-mentioned member so as to enable the setting of the calculator to be kept properly adjusted.

10. Apparatus for use in the fire control of antiaircraft guns on a ship or other unstable platform, comprising a calculator, a member operated by said calculator in accordance with the "generated" angle of training of the target, said angle being independent of the rolling and rocking of the platform, a controlling sight, means for training said sight in following the target, a member moved by said means in accordance with the uncorrected, "unstabilized" angle of training, means for determining the lateral error due to the rolling and rocking of the platform, a member moved in accordance with said lateral error, means for algebraically adding the movement of the last-mentioned member to the movement of the member moved in accordance with the "unstabilized" angle of training, a member moved in accordance with the resultant corrected, "stabilized" angle of training, a pointer operated by the last-mentioned member, and a comparison pointer operated by the first-mentioned member so that the setting of the calculator can be kept properly adjusted.

11. Apparatus for use in the fire control of antiaircraft guns on a ship or other unstable platform, comprising a calculator, a member operated by said calculator in accordance with the "generated" angle of training of the target, said angle being independent of the rolling and rocking of the platform, a controlling sight, means for training said sight in following the target, a member moved by said means in accordance with the uncorrected, "unstabilized" angle of training, means for determining the lateral error due to the rolling and rocking of the platform, a member moved in accordance with said lateral error, means for algebraically adding the movement of the last-mentioned member to the movement of the member moved in accordance with the "unstabilized" angle of training, a member moved in accordance with the resultant corrected, "stabilized" angle of training, a plotting device, means operated by the last-mentioned member for making a plot, and means operated by the first-mentioned member for making a corresponding plot so as to enable the setting of the calculator to be kept properly adjusted.

12. Apparatus for use in the fire control of antiaircraft guns on a ship or other unstable platform, comprising in combination with the elements claimed in claim 9, of means for determining the sight training cross level correction, said correction being equal to the angle in a datum horizontal plane formed by the traces of the vertical plane containing the line of sight when the sight trunnions are truly horizontal and the vertical plane containing the line of sight when the sight trunnions are inclined, means for determining the gun training cross level correction, said correction being equal to the angle in a datum horizontal plane formed by the traces of the vertical plane containing the axis of the gun when the gun trunnions are truly horizontal and the vertical plane containing the axis of the gun when the gun trunnions are inclined, a member moved in accordance with the difference between the sight training cross level correction and the gun training cross level correction, means for algebraically adding the movement of the last-mentioned member to the movement of the member moving in accordance with the "unstabilized" angle of training of the controlling sight, and another member moved in accordance with the sum.

JOHN PERCIVAL WATSON.